Figure 4:
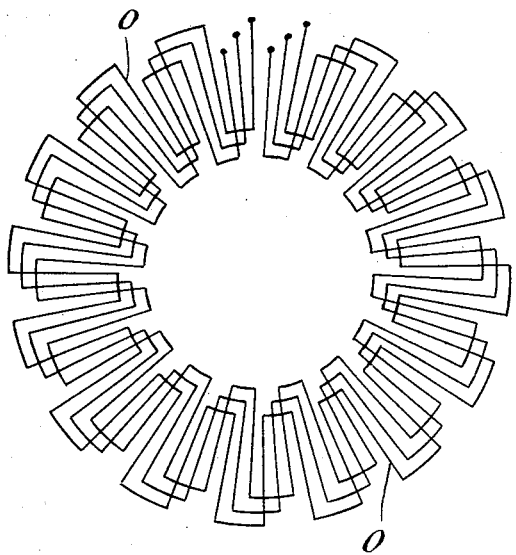

No. 741,271. PATENTED OCT. 13, 1903.
E. H. PORTER & B. CURRIER.
TURBINE ELECTRIC GENERATOR.
APPLICATION FILED OCT. 9, 1902.
NO MODEL. 3 SHEETS—SHEET 1.
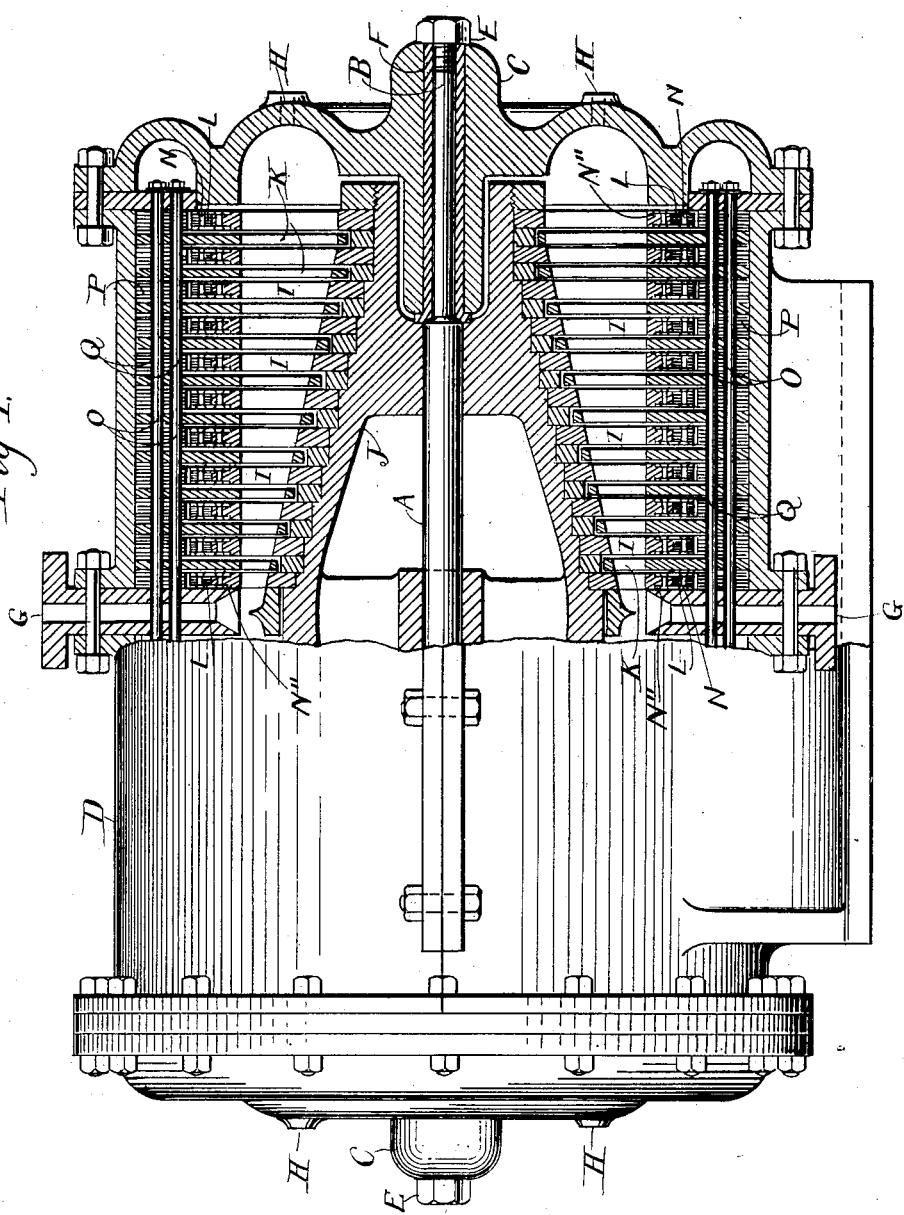
Witnesses
A. A. de Bomeville
Otto Greenberg
By their Attorney
Edward P. Thompson
Inventors
E. H. PORTER
B. CURRIER No. 741,271. PATENTED OCT. 13, 1903.
E. H. PORTER & B. CURRIER.
TURBINE ELECTRIC GENERATOR.
APPLICATION FILED OCT. 9, 1902.
NO MODEL. 3 SHEETS—SHEET 2.
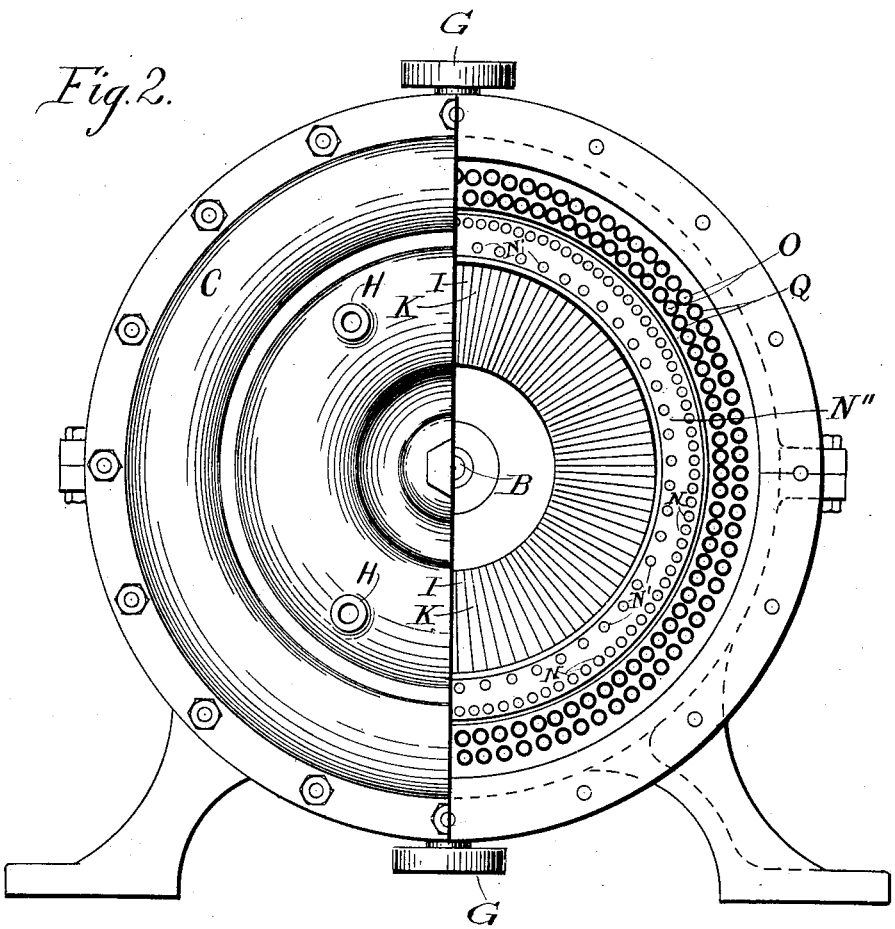
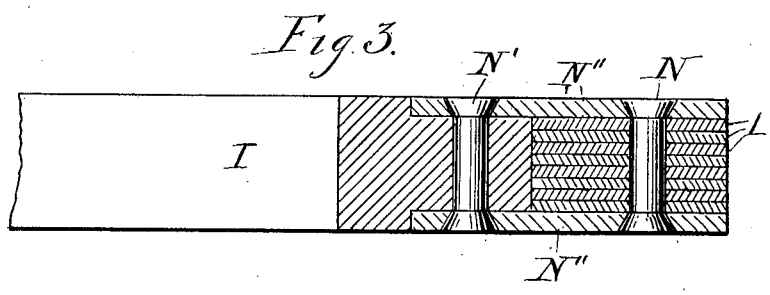
Witnesses
A. A. de Bonneville
Otto Greenberg
By their Attorney
Edward P. Thompson
Inventors
E. H. PORTER
B. CURRIER No. 741,271. PATENTED OCT. 13, 1903.
E. H. PORTER & B. CURRIER.
TURBINE ELECTRIC GENERATOR.
APPLICATION FILED OCT. 9, 1902.
NO MODEL. 3 SHEETS—SHEET 3.

WITNESSES:
Anna R. McCole
I. W. Kelly

INVENTORS
E. H. Porter
B. Currier
BY Edward P. Thompson
ATTORNEY

No. 741,271. Patented October 13, 1903.

UNITED STATES PATENT OFFICE.

EDWIN H. PORTER AND BURLEIGH CURRIER, OF PHILADELPHIA, PENNSYLVANIA.

TURBINE ELECTRIC GENERATOR.

SPECIFICATION forming part of Letters Patent No. 741,271, dated October 13, 1903.

Application filed October 9, 1902. Serial No. 126,635. (No model.)

*To all whom it may concern:*

Be it known that we, EDWIN H. PORTER and BURLEIGH CURRIER, citizens of the United States of America, and residents of Philadelphia, in the county of Philadelphia and State of Pennsylvania, have invented certain new and useful Improvements in Turbine Electric Generators, of which the following is a specification.

Our invention relates to an electric generator, but more particularly to novel means for generating electricity by the action of steam or other gas under pressure.

Heretofore it has been common to couple up a dynamo to the shaft of a steam-turbine. Our conception consists in providing a cylinder with heads at both ends and locating therein the turbine and elements of an electric generator, whereby several objections to the old plan are removed. For example, the shaft of the turbine may be smaller where it passes into the bearings than in the old arrangement, other things being the same. Furthermore, the ends of the shaft need not extend through the bearings, but only part way into the same, and the bearings may be plugged up, thereby preventing all leakage of steam. Besides these advantages the machine occupies little more than half of the space taken up by the old combination. The weight is also much less. All heat generated in the magnetic or electrical conductors by the operation of the generator is returned to the steam and so not radiated to the external air, keeping the conductors at the temperature of steam, thereby allowing high efficiency and heavy overloads.

The organization by which we secure the several advantages consists of the following elements: a cylinder whose head supports bearings; a turbine the ends of whose shafts extend into said bearings, but not through the same; plugs inserted into the bearings for preventing any escape of steam, and dynamo elements — namely, the field-magnet and armature, one of which is carried on the peripheries of the vanes of the turbine and the other of which is built upon the interior surfaces of the cylinder within close proximity of the rotor of the generator. Of course admission and exhaust ports are provided.

More generally stated, the invention consists of a cylinder, an element inside thereof adapted to be rotated by steam or other gas under pressure, and a rotor and stator of an electric generator, carried, respectively, by said element and said cylinder.

The invention is described by reference to the accompanying drawings.

Figure 5:
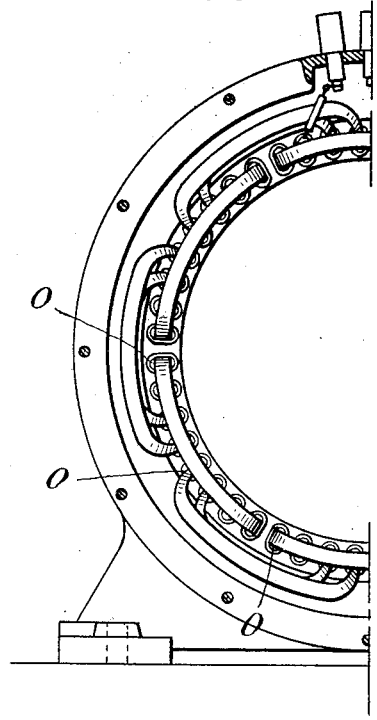
Figure 6:
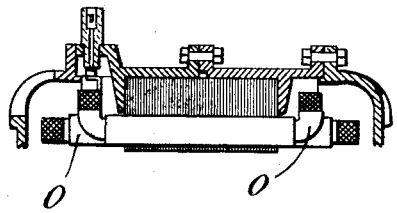

Figure 1 is a general side elevation shown partly in exterior and partly by central longitudinal sections. Fig. 2 is an end elevation, one half of which is exterior and the other half a diagram or outline of the main elements. Fig. 3 is an enlarged view of one of the details. Fig. 4 is a diagram showing the principle upon which the conductors are arranged in the stator, the radial lines representing the bars O. It is immaterial how many poles the stator has. Fig. 4 shows a different number from what the generator in Figs. 1 and 2 has. Each pair of conductors O in Figs. 1 and 2 being in multiple correspond to one radial line in Fig. 4. Further explanation of these windings, which have nothing to do with our invention, may be found in S. P. Thompson's treatise, *Polyphase Electric Currents*, edition of 1900, and published by E. & F. Spon, London, and Spon & Chamberlain, New York, Figure 347 and the explanation thereof. Fig. 5 serves to show in elevation the general connections for grouping the stator-conductors O. Instead of showing two conductors O in pairs, the one nearer the axle A than the other, this figure shows such conductors merged into only one circular row, and the number of poles would be different in Fig. 5 also, which shows a six-pole three-phase combination of circuits. In Fig. 5 the number of conductors O in the whole circle is not the same as shown in Fig. 4. Further explanation of the grouping of the stator-conductors may be found in the same book referred to above. Fig. 6 is a cross-section of the upper part of the stator shown in Fig. 5, some of the conductors being shown at O.

A is the shaft of the turbine, having reduced ends B, extending into but not through the head C of the cylinder D.

E represents screw-plugs for closing the bearings, thereby preventing leakage of steam, the bearings being represented by the bushings F, located in holes in the heads C. The admission-ports are at G, and the exhaust-ports are at H.

The rotary vanes are lettered I and are carried by the spider J on the shaft A.

K represents stationary vanes located, respectively, between the rotary vanes and extending inwardly and radially from and supported by the cylinder D. Upon the peripheries of the rotary vanes are located squirrel-cage rotors L, consisting generally of ring-shaped iron plates at L, laminated in the usual manner, and electric conductors N, N,' extending through the same, and connected by the short-circuiting ring N." The stator consists of the electric conductors O, acting also as bolts, and laminated iron rings P, through which said conductors pass from one end of the cylinder to the other and surrounded by fireproof insulating-tubes Q. The laminated iron rings P form cylindrical surfaces close to the outer cylindrical surfaces of the individual rotors at L, there being air-gaps between the two elements of the generator.

The operation consists simply in admitting steam and driving the turbine in the usual manner, whereby the rotors at L are rotated within inductive distance of the stator. The steam enters the turbine at the ports G, strikes the movable vanes I and stationary vanes K alternately in its course through the turbine in both lateral directions from the middle thereof, and then the steam has its exit at the ports H on opposite ends of the turbine.

The electrical connections are not shown, as they may be varied and are well known in the art to which this invention appertains and because my invention relates to the mechanical construction rather than to any new electric system of distribution.

The conductors N, as well as the rivets N', act as the elements of a squirrel-cage rotor, while the flat rings N" are the short-circuiting conductors for the rotor for carrying the current generated by induction in the conductors N N'.

For further disclosure of the nature and details of this class of turbine we refer to patent of Parsons, No. 328,710, of October 20, 1885, and for a better understanding of the type of generator illustrated the following patent may be referred to—namely, Tesla's, No. 382,279, of May 1, 1888. We refer to this Tesla patent to show that the operation of this generator is based on the rotary field squirrel-cage rotor type of machine mentioned therein. The fact is well known that such a type of motor will when run in multiple with other separately-excited generators same as when run as a motor if driven from an external source above synchronism act as a generator giving off electrical energy. Also that above construction will operate as a generator alone and independently if used in conjunction with condensers. For explanation of this principle see Patents, Hutin and Leblanc, Nos. 606,761 and 606,762, and Bradley, No. 715,545.

Although we have represented the Parsons type of turbine and the Tesla type of induction-motor employed as a generator, yet the application of our invention is not restricted to these particular types. It is to be understood, however, that our invention applies particularly to induction-generators.

We claim as our invention—

1. The combination of a cylinder having admission and exhaust ports, heads therefor, bearing-supports in said heads, said supports having shaft-bearings therein, a shaft carried by said bearings, a hub upon said shaft, vanes radiating in circular rows from and supported by said hub, rotors of an induction-generator carried upon said vanes, stationary vanes supported by said cylinder between every two rows of the first-named vanes, electric conductors extending from one end of the cylinder to the other so as to be within inductive action of each one of the rotors, and laminated iron plates for the rotors and stator, the one set of iron plates for the rotors having cylindrical surfaces at the peripheries of the rotary element, and the laminated plates of the stator having cylindrical surfaces just escaping the surfaces of the rotors.

2. The combination of a cylinder having admission and exhaust ports, heads therefor, bearing-supports in said heads, said supports having shaft-bearings therein, a shaft in said bearings, a hub upon said shaft, vanes radiating in circular rows from and supported by said hub, rotors of an induction-generator carried upon said vanes, stationary vanes supported by said cylinder between every two rows of the first-named vanes, electric conductors extending from one end of the cylinder to the other so as to be within inductive action of each one of the rotors, and laminated iron plates for the rotors and stator, one set of iron plates for the rotors having a cylindrical surface at the peripheries of the rotary element, and the laminated iron plates for the stator having cylindrical surfaces just escaping the cylindrical surfaces of the rotors, and fireproof insulating-tubes surrounding the conductors of the stator, said electrical conductors being suitably connected together and to other conductors outside the cylinder, the laminated plates, conductors, insulating-tubes and vanes being within said cylinder.

In testimony whereof we have hereunto subscribed our names this 2d of October, 1902.

EDWIN H. PORTER. [L. S.]
BURLEIGH CURRIER. [L. S.]

Witnesses:
CHARLES E. LEX,
WM. R. STACKHOUSE.